Patented May 25, 1926.

1,586,474

UNITED STATES PATENT OFFICE.

ADAM SASSUR, OF CHICAGO, ILLINOIS, ASSIGNOR OF ONE-HALF TO WILLIAM A. SCHLUMBOM, OF CHICAGO, ILLINOIS.

PROCESS FOR COLORING BRICK.

No Drawing.   Application filed June 24, 1925. Serial No. 39,382.

The present invention relates to the coloring of iron slag and steel slag brick, iron slag and steel slag cement brick, sand lime brick, bricks made of Portland cement, mortar, and similar materials, by the use of ferruginous quartz red jasper, hematite, limonite, siderite, ferromanganese.

In the manufacture of iron slag brick, cement slag brick, cement blocks, sand lime brick, and similar articles, many attempts have been made to color the same, but so far as I am advised heretofore it has not been possible to produce good shades of red, yellow, brown and the like, which will be uniform and stable.

In accordance with the present invention I have found that by the use of ferruginous quartz, especially red jasper and hematite sesquioxide of iron, I can produce products of a red, yellow, and brown color.

Jasper is an impure opaque colored quartz containing iron compounds. Different varieties of oxides are of somewhat different color, thus hematite sesquioxide of iron is red, siderite, a carbonate of iron, is yellowish brown, and limonite is a brown oxide.

These minerals can be used in the pulverized state and mixed with any of the material used for making bricks, blocks, etc., for the production of the desired color.

It is unnecessary in the present specification to point out in detail how to make the slag blocks, sand lime brick or other similar articles, and I call attention to numerous prior patents on the making of these articles. In accordance with the present invention I incorporate with the batch of material which is to be used for making such articles, a sufficient amount of the ferruginous quartz red jasper, hematite, limonite, siderite, or ferromanganese, before the final pressing operation, to produce the desired shade of color, after which the formation of the blocks is completed and in the usual and well known manner.

In the usual manufacture of iron slag bricks, steel slag bricks, sand lime bricks and the like, about five to eight percent of lime must be used, and after the brick has been molded, it is placed in a dry boiler and is left there under 100 to 125 pounds steam pressure for 8 to 12 hours, for a hardening operation. During this hardening operation, in most of the coloring processes heretofore described in the art, the color of the brick is likely to fade a good deal, whereas in accordance with the present invention the color does not change in any manner during this operation. I have found that the desired amount of color in products as above referred to can be produced by using in the compositions from which the bricks, blocks, mortar and so on are made, from two to ten percent or so of the ferruginous quartz, hematite, limonite, or siderite, sufficient to give the desired tint to the finished article.

Example of the preparation of iron slag and steel slag brick:—

In making this brick, the manufacturers use granulated iron slag or steel slag. This material is put into a mixer, a certain amount, say ten thousand pounds (10,000 lbs.). To this is added 5 to 8% granulated lime and if the slag is very dry, some water must be used as the moisture required is from 14 to 16%. Usually the slag holds so much water when it is received from the steel mills, and is ready for mixing without adding water. To get the desired red color, there must be added from 2% for light red to 8% for dark red, of the pulverized ferruginous quartz, or hematite red sesquioxide, and to make a brown reddish brick, limonite oxide, and for a yellow brick, siderite carbonate of iron must be used, and in making a buff brick, ferromanganese must be used. The whole being mixed for twenty minutes, is now ready to be pressed into bricks. Exactly the same proportion and similar procedure is used for sand lime bricks.

The ferruginous quartz, hematite, limonite, siderite and ferromanganese, is mixed with the entire mass of material from which the bricks are to be made, all in a complete and substantially uniform manner, the more complete the mixing the better the result.

Having thus described my invention, what I claim is:

A shaped plastic article of the character above described, containing a cementing agent of a mineral nature, and containing ferruginous quartz in comminuted state as a coloring agent, present to the extent of about 2 to 10%, such shaped article retaining its color when subjected to dry steam treatment for hardening the said article.

In testimony whereof I affix my signature.

ADAM SASSUR.